United States Patent

Hamamatsu et al.

[11] Patent Number: 5,841,445
[45] Date of Patent: Nov. 24, 1998

[54] IMAGE DISPLAYING APPARATUS

[75] Inventors: Toshihiko Hamamatsu, Saitama; Masayuki Suematsu, Chiba; Makoto Kondo, Kanagawa, all of Japan

[73] Assignee: Sony Corporation, Tokyo, Japan

[21] Appl. No.: 666,595

[22] Filed: Jun. 18, 1996

[30]    Foreign Application Priority Data

Jun. 30, 1995    [JP]    Japan ..................................... 7-165356

[51] Int. Cl.$^6$ .................................................. G06F 13/00
[52] U.S. Cl. ........................... 345/508; 345/196; 345/523
[58] Field of Search .................................. 345/508, 196, 345/507, 509, 521, 515, 514, 203, 523

[56]                     References Cited

U.S. PATENT DOCUMENTS

| 4,292,652 | 9/1981 | Yumde et al. | 348/424 |
| 4,833,371 | 5/1989 | Boon et al. | 348/540 |

FOREIGN PATENT DOCUMENTS

| 0304326 | 8/1988 | European Pat. Off. . |
| 0471878 | 2/1992 | European Pat. Off. . |

OTHER PUBLICATIONS

Masuda et al. "Picture in picture system with a digital memory for VCRs" IEEE Transactions on Consumer Electronics, vol. 33, No. 3 1987, New York pp. 230–238.

Abe et al. "Double–Window TV Display Full–Color Images Side by Side" JEE Journal of Electronics Engineering, vol. 31, No. 334, Oct. 1994, Tokyo, pp. 35–37.

*Primary Examiner*—Kee M. Tung
*Attorney, Agent, or Firm*—Jay H. Maioli

[57]                     ABSTRACT

An image displaying apparatus comprises a line memory from which each line period segment of a first video signal is read during a half line period to produce a first half line period video signal segment, first and second field memories, from each of which each of line period segments contained in each odd or even field period portion of a second video signal is read during a half line period to produce a second or third half line period video signal segment, a signal selector operative to extract alternately the first and second half line period video signal segments to form a first field period video signal portion or extract alternately the first and third half line period video signal segments to form a second field period video signal portion, a dual image display portion for displaying double window picture images in response to the first and second field period video signal portions, an overtaking detector for detecting an overtaking reading condition possibly caused in the first and second field memories, and a writing and reading controller operative to control a timing for writing and reading of the field period portions in the first field memory and a timing for writing and reading of the field period portions in the second field memory so as to suppress defects of display resulting from the overtaking reading and appearing on the double window picture images displayed on the dual image display portion when the overtaking reading condition is detected by the overtaking detector.

7 Claims, 3 Drawing Sheets

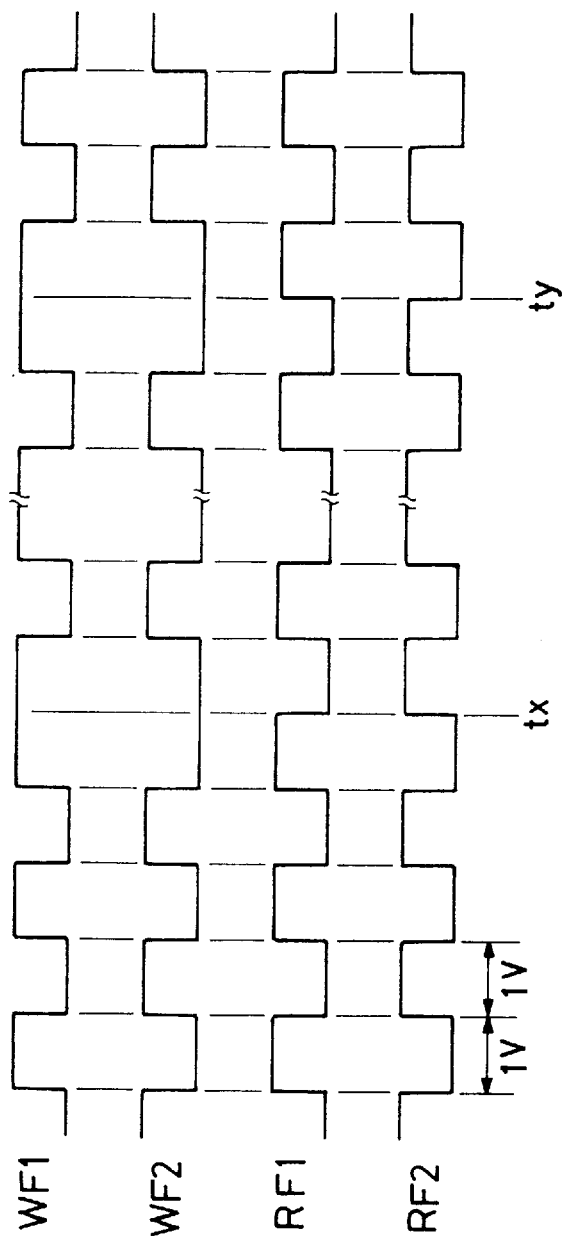
FIG. 5A WF1
FIG. 5B WF2
FIG. 5C RF1
FIG. 5D RF2
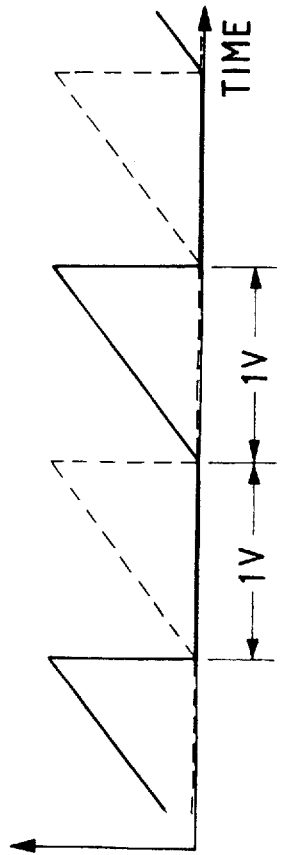
FIG. 6

IMAGE DISPLAYING APPARATUS

BACKGROUND OF THE INVENTION

1. Field of the Invention

The present invention relates generally to image displaying apparatus, and is directed to an improvement in an image displaying apparatus operative to display images which are represented by two independent video signals, respectively, to form double window pictures on a single image displaying screen.

2. Description of the Prior Art

There has been proposed, as a part of diverse systems for providing various kinds of image information, a double window image displaying system by which images represented by two independent video signals, respectively, are displayed to form a double window pictures on a single image displaying device. In the double window image displaying system, for example, an image displaying apparatus which has an image displaying flat screen on which horizontal and vertical scannings (line and field scannings) are conducted is used for displaying images represented by two independent video signals, respectively, to form double window picture images arranged to be adjacent each other in the direction of line scanning on the image displaying flat screen.

When the double window pictures arranged to be adjacent each other in the direction of line scanning are displayed on the image displaying flat screen of the image displaying apparatus, supposing that the size in the direction of line scanning of one of the double window pictures is substantially the same as that of the other of the double window pictures and therefore the double window pictures are displayed on left and right halves of the image displaying flat screen, respectively, it is necessary that a video signal supplied to the image displaying apparatus for displaying the double window pictures contains successive line period segments, each of which comprises a first time base compressed video signal component formed by compressing the time base of one line period segment (1H) of a first video signal into a half line period segment (0.5H) and a second time base compressed video signal component formed by compressing the time base of one line period segment of a second video signal into a half line period segment and coupled with the first time base compressed video signal component.

To obtaine the video signal containing such successive line period segments as described above to be used for displaying the double window picture, it is considered to take, for example, such a signal synthesizing method as to utilize a line memory which is available for writing and reading one line period segment of a video signal for causing each line period segment of the first video signal to be compressed in time base into a half line period segment to produce the first time base compressed video signal component and a couple of field memories, each of which is available for writing and reading one field period portion of a video signal, for causing each of line period segments contained in each field period portion of the second video signal to be compressed in time base into a half line period segment to produce the second time base compressed video signal component and to synthesize the first and second time base compressed video signal components with each other.

In the step for obtaining the first time base compressed video signal component, each of line period segments of the first video signal is successively written in the line memory and then each written line period segment of the first video signal is read from the line memory during a reading period corresponding substantially to a half line period. The starting time point of the reading period is set to coincide with the ending time point of the period for writing each line period segment of the first video signal in the line memory. Namely, each of line period segments of the first video signal is successively written in the line memory in such a manner as shown by a broken line in FIG. 1 wherein the axis of abscissas represents time and the axis of ordinates represents an address number in a line memory and the written line period segment of the first video signal is read from the line memory in such a manner as shown by a solid line in FIG. 1.

The reading of one line period segment from the line memory as shown by the solid line in FIG. 1 is caused to start at the time point where the writing of the subject line period segment in the line memory is completed and proceeded at the reading speed twice as rapid as the writing speed, so as to finish at a time point later by about a half line period than the time point where the writing of the subject line period segment in the line memory is completed. Accordingly, the reading of each line period segment from the line memory is intermittently conducted for one half line period at every other half line period. In such a manner as mentioned above, the first time base compressed video signal component is obtained from the line memory.

Further, in the step for obtaining the second time base compressed video signal component, each of odd field period portions of the second video signal is successively written in one of the couple of field memories (a first field memory) and each of even field period portions of the second video signal is successively written in the other of the couple of field memories (a second field memory). Then, each of line period segments contained in each written odd field period portion of the second video signal is successively read from the first field memory during a reading period corresponding substantially to a half line period, so that a time base compressed video signal based on the odd field period portions of the second video signal is obtained in the form of an output signal read from the first field memory. Similarly, each of line period segments contained in each written even field period portion of the second video signal is successively read from the second field memory during a reading period corresponding substantially to a half line period, so that a time base compressed video signal based on the even field period portions of the second video signal is obtained in the form of an output signal read from the second field memory.

Subsequently, the output signal read from the first field memory and the output signal read from the second field memory are combined with each other to produce the second time base compressed video signal component.

The first time base compressed video signal component obtained from the line memory and the second time base compressed video signal component obtained from the first and second field memories are so synthesized that, for example, each half line period segment of the second time base compressed video signal is coupled with each corresponding half line period segment of the first time base compressed video signal to form one line period segment. Consequently, a video signal representing double window picture images in which each line period segment comprises a first half made of the first time base compressed video signal component based on the first video signal and a second half made of the second time base compressed video signal based on the second video signal component is produced.

Under such a situation, since the first and second video signals are not in mutually synchronous condition but independent of each other, a problem in synchronization between the first and second video signals arises on production of the video signal representing double window picture images. Accordingly, there has been proposed to make such an arrangement that although the first video signal is written in the line memory in accordance with a writing control signal based on a synchronous signal contained in the first video signal and the second video signal is written in the first and second field memories in accordance with a writing signal based on a synchronous signal contained in the second video signal, each of the line period segments of the first video signal is read from the line memory in accordance with a reading control signal based on a synchronous signal contained in the first video signal and each of the field period portions of the second video signal is read from the first and second memories in accordance with also the reading control signal based on a synchronous signal contained in the first video signal, so that the first time base compressed video signal component read from the line memory and the second time base compressed video signal component read from the first and second field memories are synchronous with each other.

When the video signal representing double window picture images is produced as described above, each field period portion of the second video signal is written in the first and second field memories in accordance with the writing control signal based on the synchronous signal contained in the second video signal and then each written field period portion is read from the first and second field memories in accordance with the reading control signal based on the synchronous signal contained in the first video signal. Therefore, in each of first and second field memories, it is feared that each line period segments contained in each field period portion of the second video signal is written in the first and second field memories in such a manner as shown by a broken line in FIG. 2 wherein the axis of abscissas represents time and the axis of ordinates represents an address number in a line segment of a field memory and each written line period segments contained in each field period portion of the second video signal is read from the first and second field memories in such a manner that the reading of the line period segment starts at a time point after a time point at which the writing of the line period segment starts and finishes at a time point before a time point at which the writing of the line period segment finishes, as shown by a solid line in FIG. 2, when the first and second video signals has a specific synchronization therebetween.

In the case shown in FIG. 2, when the line period segment of the second video signal is written in the first or second field memory during a writing period from a time point ta to a time point td, which corresponds to 1H, the subject line period segment of the second video signal is read from the first or second field memory during a reading period from a time point tb after the time point ta to a time point tc before the time point td, which corresponds to 0.5H. This means that the address number for the reading of the line period segment overtakes the address number for the writing of the line period segment on the way of the reading period so as to cause a so-called overtaking reading.

When the overtaking reading is caused, although the second video signal written immediately before the current reading is read from the first or second field memory during a period a commencing with the time period tb shown in FIG. 2, which forms a part of the reading period wherein the address number for the reading has not overtaken the address number for the writing, the second video signal written two field periods (one frame period) before the current reading is read from the first or second field memory during a period b succeeding the period a to the time point tc shown in FIG. 2, which forms another part of the reading period wherein the address number for the reading just overtakes or has overtaken the address number for the writing. Consequently, each of the half line period segments of the second time base compressed video signal component obtained intermittently from the first and second field memories contains a discontinuous portion.

As a result of the overtaking as mentioned above, double window picture images displayed on an image displaying apparatus to which the video signal representing double window picture images which is produced by synthesizing the second time base compressed video signal component obtained from the first and second field memories with the first time base compressed video signal component obtained from the line memory is supplied, includes defects of display resulting from the discontinuous portions in the intermittent half line period segments of the second time base compressed video signal. These defects of display on the double window picture images appear in such a manner that, although a left picture image PL based on the first time base compressed video signal component is correctly displayed, a right picture image PR based on the second time base compressed video signal component is displayed to include a vertical border X bring about divergences in picture between both sides thereof, as shown in FIG. 3.

OBJECTS AND SUMMARY OF THE INVENTION

Accordingly, it is an object of the present invention to provide an image displaying apparatus operative to utilize a line memory for causing each line period segment of one of two video signals to be compressed in time base into a half line period segment to produce a first time base compressed video signal component and a couple of field memories for causing each of line period segments contained in each field period portion of the other of two video signal to be compressed in time base into a half line period segment to produce a second time base compressed video signal component and to synthesize the first and second time base compressed video signal components to obtain a video signal representing double window picture images, and further operative to display images based on the video signal thus obtained, which avoids the aforementioned difficulties encountered with the prior art.

Another object of the present invention is to provide an image displaying apparatus operative to utilize a line memory for causing each line period segment of one of two video signals to be compressed in time base into a half line period segment to produce a first time base compressed video signal component and a couple of field memories for causing each of line period segments contained in each field period portion of the other of two video signal to be compressed in time base into a half line period segment to produce a second time base compressed video signal component and to synthesize the first and second time base compressed video signal components to obtain a video signal representing double window picture images, and further operative to display images based on the video signal thus obtained, in which, even in the case where the overtaking reading is caused in the field memories utilized for producing the second time base compressed video signal component, double window picture images on which defects of display resulting from the overtaking reading are effectively suppressed can be displayed on a dual image display portion to which the video signal representing double window picture images is supplied.

According to the present invention, there is provided an image displaying apparatus comprising a line memory in which each of line period segments of a first video signal is successively written and from which each written line period segment of the first video signal is read during a reading period corresponding substantially to a half line period intermittently to produce a first half line period video signal segment, a first field memory in which each of odd field period portions of a second video signal is successively written and from which each of line period segments contained in each written odd field period portion of the second video signal is read during a reading period corresponding substantially to a half line period intermittently to produce a second half line period video signal segment, a second field memory in which each of even field period portions of the second video signal is successively written and from which each of line period segments contained in each written even field period portion of the second video signal is read during a reading period corresponding substantially to a half line period intermittently to produce a third half line period video signal segment, a signal selector operative to perform selectively a first operation for extracting alternately the first half line period video signal segment obtained from the line memory and the second half line period video signal segment obtained from the first field memory to form a first field period video signal portion and a second operation for extracting alternately the first half line period video signal segment obtained from the line memory and the third half line period video signal segment obtained from the second field memory to form a second field period video signal portion, a dual image display portion for displaying double window picture images corresponding to images represented by the first and second video signals, respectively, in response to the first and second field period video signal portions obtained alternately and successively from the signal selector, an overtaking detecting portion for detecting a condition of overtaking reading of the line period segment possibly caused in the first and second field memories, and a writing and reading controller operative to control a timing for writing and reading of the odd field period portions of the second video signal in the first field memory and a timing for writing and reading of the even field period portions of the second video signal in the second field memory so as to suppress defects of display resulting from the overtaking reading and appearing on the double window picture images displayed on the dual image display portion when the condition of overtaking reading of the line period segment is detected by the overtaking detecting portion.

In the image displaying apparatus thus constituted in accordance with the present invention, under a situation in which the line period segments of the second video signal are written in and then read from each of the first and second field memories to produce the second and third half period video signal segments, if the condition of overtaking reading of the line period segment wherein an address number for reading the line period segment overtakes an address number for writing the line period segment is caused, the condition of overtaking reading is detected by the overtaking detecting portion. Then, when the condition of overtaking reading is detected by the overtaking detecting portion, the timing for writing and reading of the odd field period portions of the second video signal in the first field memory and the timing for writing and reading of the even field period portions of the second video signal in the second field memory are controlled by the writing and reading controller.

This control of the timing for writing and reading by the writing and reading controller is carried out in such a manner that, for example, the timing for writing and reading by which each odd field period portion of the second video signal is written successively in the first field memory and each even field period portion of the second video signal is written successively in the second field memory is changed into the timing for writing and reading by which each odd field period portion of the second video signal is written successively in the second field memory and each even field period portion of the second video signal is written successively in the first field memory.

After the control of the timing for writing and reading has been done by the writing and reading controller, the line period segments of the second video signal written one field period before the current reading are read from each of the first and second field memories to produce the second and third half line period video signal segments. Therefore, each of the second and third half line period video signal segments obtained from the first and second field memories, respectively, does not include any discontinuous portion resulting from the overtaking reading of the line period segment.

Consequently, the first and second field period video signal portions obtained alternately and successively from the signal selector and supplied to the dual image display portion, which forms a video signal representing double window picture images, do not include discontinuous portions resulting from the condition of overtaking reading of the line period segment caused in the first and second field memories and double window picture images on which defects of display resulting from the overtaking reading the line period segment are effectively suppressed can be displayed on the dual image display portion to which the video signal representing double window picture images is supplied.

The above, and other objects, features and advantages of the present invention will become apparent from the following detailed description taken in conjunction with the accompanying drawings.

BRIEF DESCRIPTION OF THE DRAWINGS

FIGS. 5A, 5B, 5C and 5D are waveform diagrams used for explaining operation of the embodiment shown in FIG. 4; and FIG. 6 is a time chart used for explaining operation of the embodiment shown in FIG. 4.

DESCRIPTION OF THE PREFERRED EMBODIMENT

Figure 4:
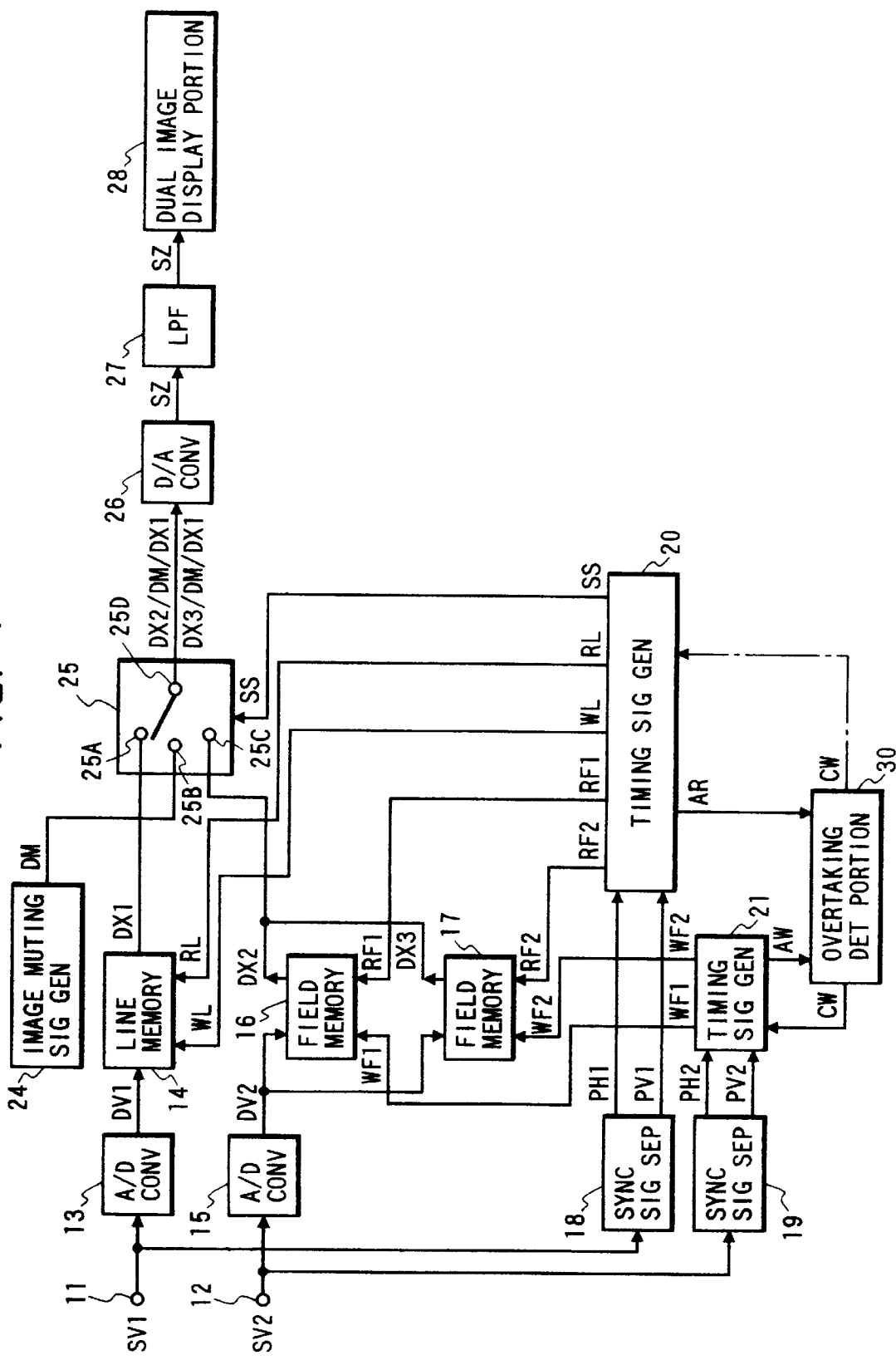
FIG. 4 is a schematic block diagram showing an embodiment of image displaying apparatus according to the present invention.

FIG. 4 shows an embodiment of image displaying apparatus according to the present invention.

Referring to FIG. 4, two video signals SV1 and SV2 independent of each other are supplied to video signal input terminals 11 and 12, respectively. In each of the video signals SV1 and SV2, one frame period portion consists of odd and even field period portions in accordance with the interlacing system.

The video signal SV1 supplied to the video signal input terminal 11 is digitalized in an analogue to digital converter (A/D converter) 13 to produce a digital video signal DV1 supplied to a line memory 14. The video signal SV2 supplied to the video signal input terminal 12 is digitalized in an A/D converter 15 to produce a digital video signal DV2 supplied to a pair of field memories 16 and 17.

The video signal SV1 from the video signal input terminal 11 and the video signal SV2 from the video signal input terminal 12 are also supplied to synchronous signal separators 18 and 19, respectively. In the synchronous signal separator 18, a horizontal synchronous signal (line synchronous signal) PH1 and a vertical synchronous signal (field synchronous signal) PV1 contained in the video signal SV1 are individually separated from the video signal SV1 and the separated horizontal and vertical synchronous signals PH1 and PV1 are supplied to a timing signal generator 20. Similarly, in the synchronous signal separator 19, a horizontal synchronous signal (line synchronous signal) PH2 and a vertical synchronous signal (field synchronous signal) PV2 contained in the video signal SV2 are individually separated from the video signal SV2 and the separated horizontal and vertical synchronous signals PH2 and PV2 are supplied to a timing signal generator 21.

In the timing signal generator 20, a group of timing signals including a writing control signal WL to the line memory 14, a reading control signal RL to the line memory 14, a reading control signal RF1 to the field memory 16, a reading control signal RF2 to the field memory 17, and a selection control signal SS, each of which is synchronized with the horizontal and vertical synchronous signals PH1 and PV1 obtained from the synchronous signal separator 18, are produced. In the timing signal generator 21, a group of timing signals including a writing control signal WF1 to the field memory 16 and a writing control signal WF2 to the field memory 17, each of which is synchronized with the horizontal and vertical synchronous signals PH2 and PV2 obtained from the synchronous signal separator 19, are produced.

In the line memory 14 to which the digital video signal DV1 obtained from the A/D converter 13 is supplied, each line period segment of the digital video signal DV1 is successively written in accordance with the writing control signal WL from the timing signal generator 20 and then each written line period segment of the digital video signal DV1 is read in accordance with the reading control signal RL from the timing signal generator 20 during a reading period substantially corresponding to a half line period. The writing control signal WL and reading control signal RL are operative to determine a time point with which the reading period substantially corresponding to a half line period commences so as to coincide with a time point at which a writing period for the line period segment of the digital video signal DV1 which is currently read terminates.

Figure 1:
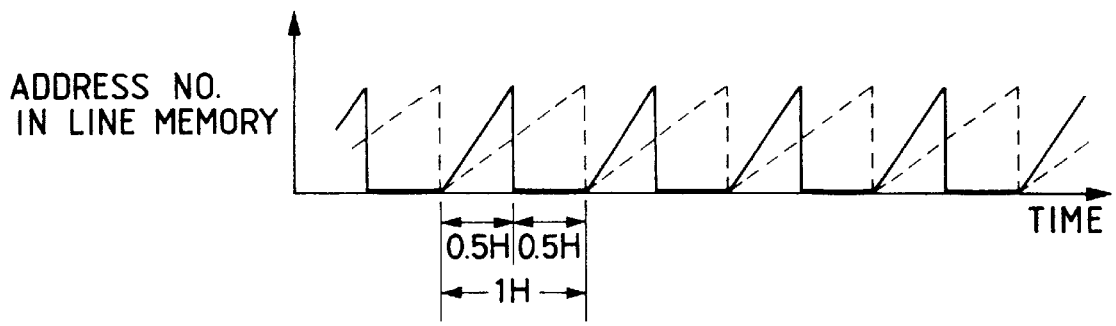
FIG. 1 is a time chart used for explaining time base compression of a video signal carried out by making use of a line memory.

Accordingly, each line period segment of the digital video signal DV1 is successively written in the line memory 14 in such a manner as shown by the broken line in FIG. 1 mentioned above and each written line period segment of the digital video signal DV1 is read from the line memory 14 in such a manner as shown by the solid line in FIG. 1 mentioned above. That is, the reading of the line period segment of the digital video signal DV1 from the line memory 14 is caused to start when the writing of the subject line period segment in the line memory 14 has been completed and proceeded at a reading speed twice as rapid as a writing speed, so as to finish at a time point later by about a half line period than the start of reading. Accordingly, the reading of each line period segment of the digital video signal DV1 from the line memory 14 is intermittently carried out for a half line period at every other half line period, so that a half line period digital video signal segment DX1 which is obtained by causing the line period segment of the digital video signal DV1 to be compressed in time base into a digital video signal of a half line period is intermittently obtained from the line memory 14.

The field memory 16 to which the digital video signal DV2 obtained from the A/D converter 15 is supplied is further supplied with the writing control signal WF1 from the timing signal generator 21 and the reading control signal RF1 from the timing signal generator 20. In the field memory 16, each of line period segments contained in each odd field period portion of the digital video signal DV2 is successively written in accordance with the writing control signal WF1 and then each of written line period segments contained in each odd field period portion of the digital video signal DV2 is successively read in accordance with the reading control signal RF1 during the reading period substantially corresponding to a half line period on the video signal SV1.

Further, the field memory 17 to which the digital video signal DV2 obtained from the A/D converter 15 is supplied is further supplied with the writing control signal WF2 from the timing signal generator 21 and the reading control signal RF2 from the timing signal generator 20. In the field memory 17, each of line period segments contained in each even field period portion of the digital video signal DV2 is successively written in accordance with the writing control signal WF2 and then each of written line period segments contained in each even field period portion of the digital video signal DV2 is successively read in accordance with the reading control signal RF2 during the reading period substantially corresponding to a half line period on the video signal SV1.

Consequently, the reading of each of the line period segments contained in each odd field portion of the digital video signal DV2 from the field memory 16 is intermittently carried out for a half line period on the video signal SV1 at every other half line period on the video signal SV1, so that a half line period digital video signal segment DX2 which is obtained by causing each of the line period segments contained in each odd field portion of the digital video signal DV2 to be compressed in time base into a digital video signal of a half line period on the video signal SV1 is intermittently obtained from the line memory 16. Similarly, the reading of each of the line period segments contained in each even field portion of the digital video signal DV2 from the field memory 17 is intermittently carried out for a half line period on the video signal SV1 at every other half line period on the video signal SV1, so that a half line period digital video signal segment DX3 which is obtained by causing each of the line period segments contained in each even field portion of the digital video signal DV2 to be compressed in time base into a digital video signal of a half line period on the video signal SV1 is intermittently obtained from the line memory 17.

The half line period digital video signal segment DX1 obtained from the line memory 14 is supplied to a selective contact 25A of a signal selector 25, and the half line period digital video signal segment DX2 obtained from the field memory 16 and the half line period digital video signal segment DX3 obtained from the field memory 17 are supplied to a selective contact 25C of the signal selector 25. Further, a digital image muting signal DM from an image muting signal generator 24 is supplied to a selective contact 25B provided between the selective contacts 25A and 25C.

The signal selector 25 is controlled in operation by the selection control signal SS which is derived from the timing signal generator 20 and synchronized with the horizontal and vertical synchronous signals PH1 and PV1 separated from the video signal SV1, so that a movable contact 25D is repeatedly moved to be connected with the selective contacts 25A, 25B and 25C successively during a period substantially corresponding to a line period on the video signal SV1. During each period substantially corresponding to a line period on the video signal SV1, a condition in which the movable contact 25D is connected with the selective contact 25A continues for a duration shorter a little bit than a half line period on the video signal SV1 and a condition in which the movable contact 25D is connected with the selective contact 25C also continues for a duration shorter a little bit than a half line period on the video signal SV1. As a result, the movable contact 25D is connected with the selective contact 25B for a very short duration in each period substantially corresponding to a line period on the video signal SV1.

In the signal selector 25, in response to each odd field period portion of the video signal SV1, the half line period digital video signal segment DX1 supplied to the selective contact 25A is extracted through the movable contact 25D for the duration shorter a little bit than a half line period on the video signal SV1, then the digital image muting signal DM supplied to the selective contact 25B is extracted to the movable contact 25D for the very short duration, and thereafter the half line period digital video signal segment DX2 supplied to the selective contact 25C is extracted through the movable contact 25D for the duration shorter a little bit than a half line period on the video signal SV1 during each period corresponding to each line period on the video signal SV1. Therefore, such a condition that the half line period digital video signal segment DX1, the digital image muting signal DM and the half line period digital video signal segment DX2 are successively derived from the movable contact 25D of the signal selector 25 to form a digital video signal of one line period is repeated to produce a digital video signal of one field period.

Further, in response to each even field period portion of the video signal SV1, the half line period digital video signal segment DX1 supplied to the selective contact 25A is extracted through the movable contact 25D for the duration shorter a little bit than a half line period on the video signal SV1, then the digital image muting signal DM supplied to the selective contact 25B is extracted to the movable contact 25D for the very short duration, and thereafter the half line period digital video signal segment DX3 supplied to the selective contact 25C is extracted through the movable contact 25D for the duration shorter a little bit than a half line period on the video signal SV1 during each period corresponding to each line period on the video signal SV1. Therefore, such a condition that the half line period digital video signal segment DX1, the digital image muting signal DM and the half line period digital video signal segment DX3 are successively derived from the movable contact 25D of the signal selector 25 to form a digital video signal of one line period is repeated to produce a digital video signal of one field period.

The digital video signal of one field period in which each line period segment comprises the half line period digital video signal segment DX1, the digital image muting signal DM and the half line period digital video signal segment DX2 and is obtained through the movable contact 25D, and the digital video signal of one field period in which each line period segment comprises the half line period digital video signal segment DX1, the digital image muting signal DM and the half line period digital video signal segment DX3 and is obtained through the movable contact 25D, are alternately supplied to a digital to analogue converter (D/A converter) 26 to be converted into an analogue video signal SZ representing double window picture images.

The analogue video signal SZ representing double window picture images thus obtained from the D/A converter 26 is subjected to noise elimination at a low pass filter (LPF) 27 and then supplied to a dual image display portion 28. In the dual image display portion 28, an image displaying flat screen on which line and field scannings are conducted is provided and double window picture images which include an image represented by the video signal SV1 and an image represented by the video signal SV2 are displayed on the image displaying flat screen. These double window picture images are arranged to be adjacent each other in the direction of line scanning with a muted portion based on the digital image muting signal DM between.

Under such a situation as mentioned above, a writing position indicating signal AW representing a writing address number in line segment of each of the field memories 16 and 17 is derived from an address counter which is provided in the timing signal generator 21 to be used for generating the writing control signals WF1 and WF2, and similarly a reading position indicating signal AR representing a reading address number in line segment of each of the field memories 16 and 17 is derived from an address counter which is provided in the timing signal generator 20 to be used for generating the reading control signals RF1 and RF2. The writing position indicating signal AW and reading position indicating signal AR are supplied to an overtaking detecting portion 30.

Figure 2:
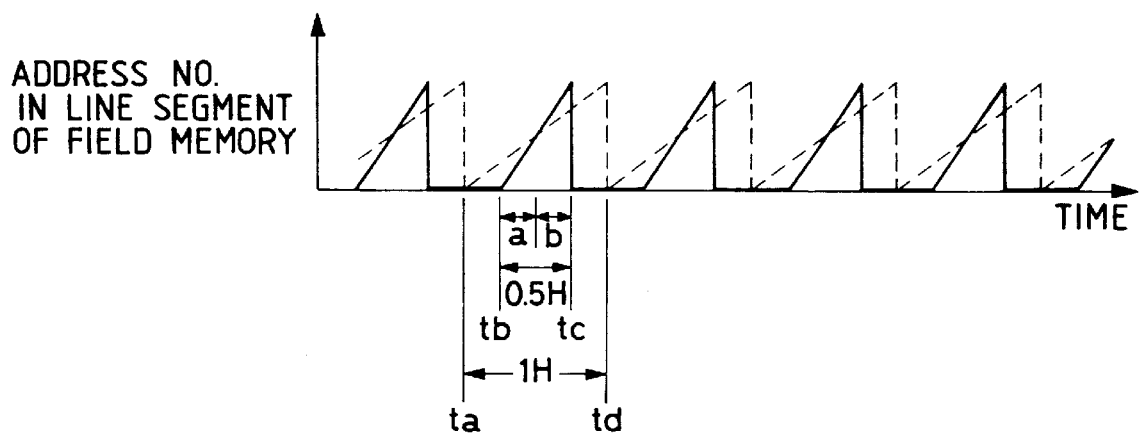
FIG. 2 is a time chart used for explaining time base compression of a video signal carried out by making use of a field memory.
Figure 3:
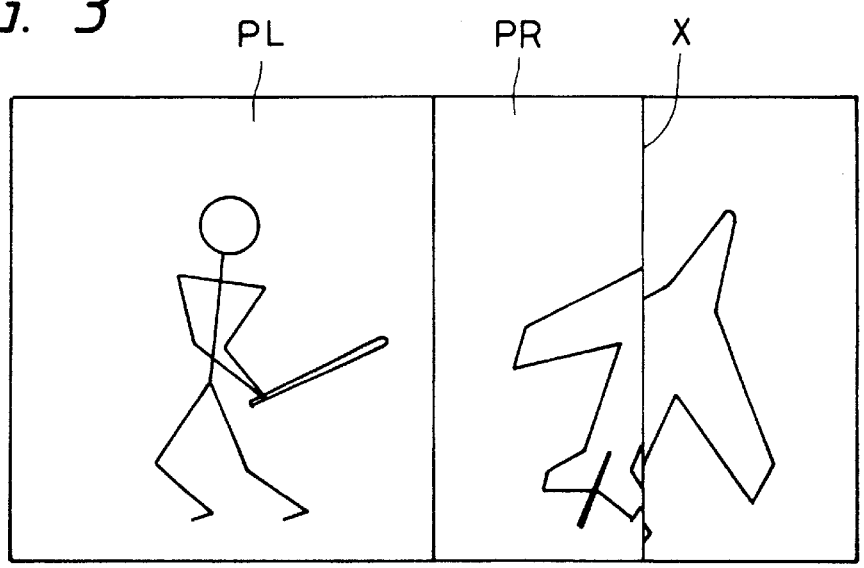
FIG. 3 is a schematic illustration used for explaining display of double window picture images.

In the overtaking detecting portion 30, the reading address number in line segment of each of the field memories 16 and 17 represented by the reading position indicating signal AR is compared with the writing address number in line segment of each of the field memories 16 and 17 represented by the writing position indicating signal AW in order to detect an overtaking reading condition in which each line period segments contained in each field period portion of the digital video signal DV2 is written in the field memories 16 and 17 in such a manner as shown by the broken line in FIG. 2 and each written line period segments contained in each field period portion of the digital video signal DV2 is read from the field memories 16 and 17 in such a manner as shown by the solid line in FIG. 2 so that the reading address number in line segment of each of the field memories 16 and 17 overtakes the writing address number in line segment of each of the field memories 16 and 17. When the overtaking reading condition is detected by the overtaking detecting portion 30, an overtaking detection output signal CW is supplied from the overtaking detecting portion 30 to the timing signal generator 21 and the writing control signals WF1 and WF2 are adjusted in timing of being sent out in response to the overtaking detection output signal CW in the timing signal generator 21.

The writing control signals WF1 and WF2 obtained from the timing signal generator 21 are produced to be synchronized with the vertical synchronous signal PV2 separated from the video signal SV2 in the synchronous signal separator 19. The writing control signal WF1 has a high level during each odd field period on the video signal SV2 and a low level during each even field period on the video signal SV2 and puts the field memory 16 in a writing state when it has the high level. The writing control signal WF2 has a high level during each even field period on the video signal SV2 and a low level during each odd field period on the video signal SV2 and puts the field memory 17 in a writing state when it has the high level.

The reading control signals RF1 and RF2 obtained from the timing signal generator 20 are produced to be synchronized with the vertical synchronous signal PV1 separated from the video signal SV1 in the synchronous signal separator 18. The reading control signal RF1 has alternately high and low levels during every field period on the video signal SV1 and puts the field memory 16 in a reading state when it has the high level. The reading control signal RF2 has also alternately high and low levels during each field period on the video signal SV1 and puts the field memory 17 in a writing state when it has the high level.

When the overtaking reading is not caused in the field memories 16 and 17, the writing control signals WF1 and WF2 obtained from the timing signal generator 21 and the reading control signals RF1 and RF2 obtained from the timing signal generator 20 are in such a conditions before a time point tx as shown in FIGS. 5A to 5D.

In the condition before the time point tx in FIGS. 5A to 5D, the writing control signal WF1 has the high level during each odd field period on the video signal SV2 and the low level during each even field period on the video signal SV2 as shown in FIG. 5A and the writing control signal WF2 has the low level during each odd field period on the video signal SV2 and the high level during each even field period on the video signal SV2 as shown in FIG. 5B. Further, each of the reading control signals RF1 and RF2 has alternately the high and low levels during every field period on the video signal SV1 in such a manner that the reading control signal RF2 has the low level when the reading control signal RF1 has the high level and the reading control signal RF2 has the high level when the reading control signal RF1 has the low level.

Accordingly, in the condition before the time point tx in FIGS. 5A to 5D, each of the line period segments contained in each odd field period portion of the video signal SV2 is successively written in the field memory 16 in response to the high level portion of the writing control signal WF1 and each written line period segment is read from the field memory 16 in response to the high level portion of the reading control signal RF1. Similarly, in the condition before the time point tx in FIGS. 5A to 5D, each of the line period segments contained in each even field period portion of the video signal SV2 is successively written in the field memory 17 in response to the high level portion of the writing control signal WF2 and each written line period segment is read from the field memory 17 in response to the high level portion of the reading control signal RF2.

Under such a situation, supposing that the overtaking reading condition is continuously detected by the overtaking detecting portion 30 and the overtaking detection output signal CW is supplied from the overtaking detecting portion 30 to the timing signal generator 21 during a period from the time point tx to a time point ty, each of the writing control signals WF1 and WF2 is reversed in level to have the low level instead of the high level and the high level instead of the low level in response to the overtaking detection output signal CW at the time point tx and maintains the reversed condition through the period from the time point tx to the time point ty in the timing signal generator 21.

That is, in the period from the time point tx to the time point ty, the writing control signal WF1 has the low level during each odd field period on the video signal SV2 and the high level during each even field period on the video signal SV2 as shown in FIG. 5A and the writing control signal WF2 has the high level during each odd field period on the video signal SV2 and the low level during each even field period on the video signal SV2 as shown in FIG. 5B. On the other hand, each of the reading control signals RF1 and RF2 has alternately the high and low levels during every field period on the video signal SV1 in such a manner that the reading control signal RF2 has the low level when the reading control signal RF1 has the high level and the reading control signal RF2 has the high level when the reading control signal RF1 has the low level.

Accordingly, during the period from the time point tx to the time point ty as shown in FIGS. 5A to 5D wherein the overtaking reading is caused in the field memories 16 and 17 and the overtaking reading condition is continuously detected by the overtaking detecting portion 30, each of the line period segments contained in each even field period portion of the video signal SV2 is successively written in the field memory 16 in response to the high level portion of the writing control signal WF1 and, during the next field period on the video signal SV2 after the writing of the line period segments contained in the even field period portion of the video signal SV2 has been finished, each written line period segment of each even field period portion of the video signal SV2 is read from the field memory 16 in response to the high level portion of the reading control signal RF1. In such a case, the writing of the line period segments contained in each even field period portion of the video signal SV2 is caused to commence with the second line address in the field memory 16 because of consideration of the fact that the video signal SV2 contains the odd and even field period portions in accordance with the interlacing system. Further, each of the line period segments contained in each odd field period portion of the video signal SV2 is successively written in the field memory 17 in response to the high level portion of the writing control signal WF2 and, during the next field period on the video signal SV2 after the writing of the line period segments contained in the odd field period portion of the video signal SV2 has been finished, each written line period segment of each odd field period portion of the video signal SV2 is read from the field memory 17 in response to the high level portion of the reading control signal RF2.

As a result, each line period segments contained in each even field period portion of the digital video signal DV2 is written in the field memory 16 as shown by a broken line in FIG. 6, wherein the axis of abscissas represents time and the axis of ordinates represents a line address number in a field memory, and each written line period segment contained in each even field period portion of the digital video signal DV2 is read from the field memory 16 during the next field period on the video signal SV2 after the writing of the line period segments contained in the even field period portion of the video signal SV2 has been finished as shown by a solid line in FIG. 6, and each line period segments contained in each odd field period portion of the digital video signal DV2 is written in the field memory 17 as shown by the broken line in FIG. 6 and each written line period segment contained in each odd field period portion of the digital video signal DV2 is read from the field memory 17 during the next field period on the video signal SV2 after the writing of the line period segments contained in the odd field period portion of the video signal SV2 has been finished as shown by the solid line in FIG. 6, so that the half line period digital video signal segment DX2 is obtained from the field memory 16 and the half line period digital video signal segment DX3 is obtained from the field memory 17.

As described above, each of the half line period digital video signal segment DX2 obtained from the field memory 16 and the half line period digital video signal segment DX3 obtained from the field memory 17 is formed substantially under the condition wherein the overtaking reading is not caused in the field memories 16 and 17 and therefore does not include discontinuous portions resulting from the overtaking reading. Accordingly, when the half line period digital video signal segment DX2 obtained from the field memory 16 and the half line period digital video signal segment DX3 obtained from the field memory 17 are alternately supplied to the selective contact 25C of the signal selector 25 and the digital video signal of one field period in which each line period segment comprises the half line period digital video signal segment DX1, the digital image muting signal DM and the half line period digital video signal segment DX2 and the digital video signal of one field period in which each line period segment comprises the half line period digital video signal segment DX1, the digital image muting signal DM and the half line period digital video signal segment DX3 are alternately supplied to the D/A converter 26 to be converted into the analogue video signal SZ representing double window picture image, the double window picture images displayed on the dual image display portion 28 to which the analogue video signal SZ representing double window picture image is supplied are provided with effectively suppressed defects of display resulting from the overtaking reading in the field memories 16 and 17.

After that, in a period after the time point ty shown in FIGS. 5A to 5D, the overtaking reading condition is not detected by the overtaking detecting portion 30 and the overtaking detection output signal CW is ceased to be supplied from the overtaking detecting portion 30 to the timing signal generator 21. Then, each of the writing control signals WF1 and WF2 is reversed in level again to be put in the same condition as before the time point tx. That is, in the period after the time point ty shown in Figs. 5A to 5D, the writing control signal WF1 has the high level during each odd field period on the video signal SV2 and the low level during each even field period on the video signal SV2 as shown in FIG. 5A and the writing control signal WF2 has the low level during each odd field period on the video signal SV2 and the high level during each even field period on the video signal SV2 as shown in FIG. 5B. Further, each of the reading control signals RF1 and RF2 still has alternately the high and low levels during every field period on the video signal SV1 in such a manner that the reading control signal RF2 has the low level when the reading control signal RF1 has the high level and the reading control signal RF2 has the high level when the reading control signal RF1 has the low level.

The timing signal generator 21 substantially constitutes a writing and reading controller which is operative to control a timing for writing and reading of the odd field period portions of the video signal SV2 in the field memory 16 and a timing for writing and reading of the even field period portions of the video signal SV2 in the field memory 17 so as to suppress the defects of display resulting from the overtaking reading and appearing on the double window picture images displayed by the dual image display portion 28 when the overtaking reading condition in the field memories 16 and 17 is detected by the overtaking detecting portion 30.

In the aforementioned embodiment, when the overtaking reading is caused in the field memories 16 and 17 and the overtaking reading condition is detected by the overtaking detecting portion 30, each of the writing control signals WF1 and WF2 is reversed in level to have the low level instead of the high level and the high level instead of the low level, so that an operating condition in which each of the line period segments contained in each odd field period portion of the video signal SV2 is successively written in the field memory 16 and each written line period segment of each odd field period portion of the video signal SV2 is read from the field memory 16, and each of the line period segments contained in each even field period portion of the video signal SV2 is successively written in the field memory 17 and each written line period segment of each even field period portion of the video signal SV2 is read from the field memory 17, is changed into another condition in which each of the line period segments contained in each even field period portion of the video signal SV2 is successively written in the field memory 16 and, during the next field period on the video signal SV2 after the writing of the line period segments contained in the even field period portion of the video signal SV2 has been finished, each written line period segment of each even field period portion of the video signal SV2 is read from the field memory 16, and each of the line period segments contained in each odd field period portion of the video signal SV2 is successively written in the field memory 17 and, during the next field period on the video signal SV2 after the writing of the line period segments contained in the odd field period portion of the video signal SV2 has been finished, each written line period segment of each odd field period portion of the video signal SV2 is read from the field memory 17.

However, the image displaying apparatus according to the present invention is not limited to the embodiment and it is also possible to have, for example, such an arrangement that when the overtaking reading is caused in the field memories 16 and 17 and the overtaking reading condition is detected by the overtaking detecting portion 30, the overtaking detection output signal CW is supplied from the overtaking detecting portion 30 to the timing signal generator 20, as shown by a dot and dash line in FIG. 4, and thereby each of the read control signals RF1 and RF2 is reversed in level to have the low level instead of the high level and the high level instead of the low level in response to the overtaking detection output signal CW and maintains the reversed condition up to a time point at which the overtaking reading condition is not detected by the overtaking detecting portion 30 any longer.

In such a case, when the overtaking reading is caused in the field memories 16 and 17, each of the line period segments contained in each odd field period portion of the video signal SV2 is successively written in the field memory 16 and, during the next frame period on the video signal SV2 after the writing of the line period segments contained in the odd field period portion of the video signal SV2 has been finished, each of the written line period segments contained in each odd field period portion of the video signal SV2 which have been written during the frame period immediately before is read from the field memory 16, and each of the line period segments contained in each even field period portion of the video signal SV2 is successively written in the field memory 17 and, during the next frame period on the video signal SV2 after the writing of the line period segments contained in the even field period portion of the video signal SV2 has been finished, each of the written line period segments contained in each even field period portion of the video signal SV2 which have been written during the frame period immediately before is read from the field memory 17.

Further, although each of the video signals SV1 and SV2 supplied to the video signal input terminals 11 and 12, respectively, has a plurality of frame period portions each consisting of odd and even field period portions in accordance with the interlacing system in the aforementioned embodiment, the image displaying apparatus according to the present invention can properly deal with the overtaking reading caused in the field memories 16 and 17 even in the case where one of or both of the video signals SV1 and SV2 supplied to the video signal input terminals 11 and 12, respectively, have a plurality of frame period portions each constituted in accordance with the noninterlacing system.

What is claimed is:

1. An image displaying apparatus comprising;
   line memory means in which each of line period segments of a first video signal is successively written and from which each written line period segment of the first video signal is read during a reading period corresponding substantially to a half line period intermittently to produce a first half line period video signal segment,
   first field memory means in which a first every other field period portions of a second video signal is successively written and from which each of line period segments contained in each written field period portion of the second video signal is read during a reading period corresponding substantially to a half line period intermittently to produce a second half line period video signal segment,
   second field memory means in which a second every other field period portion of the second video signal is successively written and from which each of line period segments contained in each written field period portion of the second video signal is read during a reading period corresponding substantially to a half line period intermittently to produce a third half line period video signal segment,
   signal selecting means operative to perform selectively a first operation for extracting alternately the first half line period video signal segment obtained from the line memory means and the second half line period video signal segment obtained from the first field memory means to form a first field period video signal portion and a second operation for extracting alternately the first half line period video signal segment obtained from the line memory means and the third half line period video signal segment obtained from the second field memory means to form a second field period video signal portion,
   dual image display means for displaying double window picture images corresponding to images represented by the first and second video signals, respectively, in response to the first and second field period video signal portions obtained alternately and successively from the signal selecting means,
   overtaking detecting means for detecting a condition of overtaking reading of the line period segment possibly caused in the first and second field memory means, and
   writing and reading controlling means operative to control a timing for writing and reading of the first every other field period portion of the second video signal in the first field memory means and a timing for writing and reading of the second every other field period portion of the second video signal in the second field memory means so as to suppress defects of display resulting from the overtaking reading and appearing on the double window picture images displayed on the dual image display means when the condition of overtaking reading of the line period segment is detected by the overtaking detecting means.

2. An image displaying apparatus according to claim 1, wherein said writing and reading controlling means is operative to maintain a condition resulting from a control which is carried out when the condition of overtaking reading of the line period segment is detected by the overtaking detecting means up to a time point at which the condition of overtaking reading of the line period segment is not detected by the overtaking detecting means any longer.

3. An image displaying apparatus according to claim 2, wherein said writing and reading controlling means is operative to set up a condition in which the first every other field period portion of the second video signal is successively written in the second field memory means and the second every other field period portion of the second video signal is successively written in the first field memory means when the condition of overtaking reading of the line period segment is detected by the overtaking detecting means.

4. An image displaying apparatus according to claim 1, wherein said writing and reading controlling means is operative to set up a condition in which the first every other field period portion of the second video signal is successively written in the second field memory means and the second every other field period portion of the second video signal is successively written in the first field memory means when the condition of overtaking reading of the line period segment is detected by the overtaking detecting means.

5. An image displaying apparatus according to claim 1, wherein first synchronous signal separating means for extracting a synchronous signal contained in the first video signal, second synchronous signal separating means for extracting a synchronous signal contained in the second video signal, first timing signal generating means for producing writing and reading control signals to the line memory means, a reading control signal to the first field memory means and a reading control signal to the second field memory means, each of which is synchronized with the synchronous signal obtained from the first synchronous signal separating means, and second timing signal generating means for producing a writing control signal to the first field memory means and a writing control signal to the second field memory means, are further provided, and said second timing signal generating means constitutes said writing and reading controlling means.

6. An image displaying apparatus according to claim 1, wherein said writing and reading controlling means is operative to set up a condition in which, after the writing of the first every other field period portion of the second video signal in the first field memory means has finished, each of line period segments contained in each written field period portion of the second video signal in the first field memory means is read from the first field memory means, and after the writing of the second every other field period portion of the second video signal in the second field memory means has finished, each of line period segments contained in each written field period portion of the second video signal in the second field memory means is read from the second field memory means,when the condition of overtaking reading of the line period segment is detected by the overtaking detecting means.

7. An image displaying apparatus according to claim 1, wherein image muting signal generating means is provided and said signal selecting means is operative to set up selectively a first condition in which an image muting signal obtained from the image muting signal generating means is extracted in one of a time blank between the first half line period video signal segment obtained from the line memory means and the second half line period video signal segment obtained from the first field memory means and a time blank between the second half line period video signal segment obtained from the first field memory means and the first half line period video signal segment obtained from the line memory means, and the first field period video signal portion which includes the first half line period video signal segment obtained from the line memory means, the second half line period video signal segment obtained from the first field memory means and the image muting signal is formed, and a second condition in which the image muting signal obtained from the image muting signal generating means is extracted in one of a time blank between the first half line period video signal segment obtained from the line memory means and the third half line period video signal segment obtained from the second field memory means and a time blank between the third half line period video signal segment obtained from the second field memory means and the first half line period video signal segment obtained from the line memory means, and the second field period video signal portion which includes the first half line period video signal segment obtained from the line memory means, the third half line period video signal segment obtained from the second field memory means and the image muting signal is formed.

* * * * *